Jan. 1, 1924

1,479,678

E. ROLKER

ANIMAL TRAP

Original Filed June 15, 1921   2 Sheets-Sheet 2

Inventor
Edwin Rolker.

By Robert H. Watson

Attorney

Patented Jan. 1, 1924.

1,479,678

UNITED STATES PATENT OFFICE.

EDWIN ROLKER, OF BALTIMORE, MARYLAND, ASSIGNOR TO MILTON ROBERTS, OF BALTIMORE COUNTY, MARYLAND.

ANIMAL TRAP.

Application filed June 15, 1921, Serial No. 477,722. Renewed June 2, 1923.

*To all whom it may concern:*

Be it known that I, EDWIN ROLKER, a citizen of the United States, residing at Baltimore, in the State of Maryland, have invented certain new and useful Improvements in Animal Traps, of which the following is a specification.

This invention relates to improvements in animal traps. The purpose of the invention is to provide a trap the body of which can be made cheaply of sheet metal. In carrying out the invention, I form the body of the trap from two sheets of metal, similarly punched, each sheet being slotted at the end to provide end bars, and also slotted longitudinally to provide an open-work structure, and these end bars are longitudinally corrugated and bent so as to converge about annular entrance and exit fittings of smaller diameter than the body of the trap. These fittings, which are scalloped to receive the ends of the corrugated bars, are secured to the bars by rivets. The entire trap can be made with very little labor.

In the accompanying drawing, which illustrates the invention,

Fig. 1 is a side elevation of the trap, partly broken away;

Fig. 4 is a detail view showing the connection between the end bars and one of the end fittings.

Figure 2:
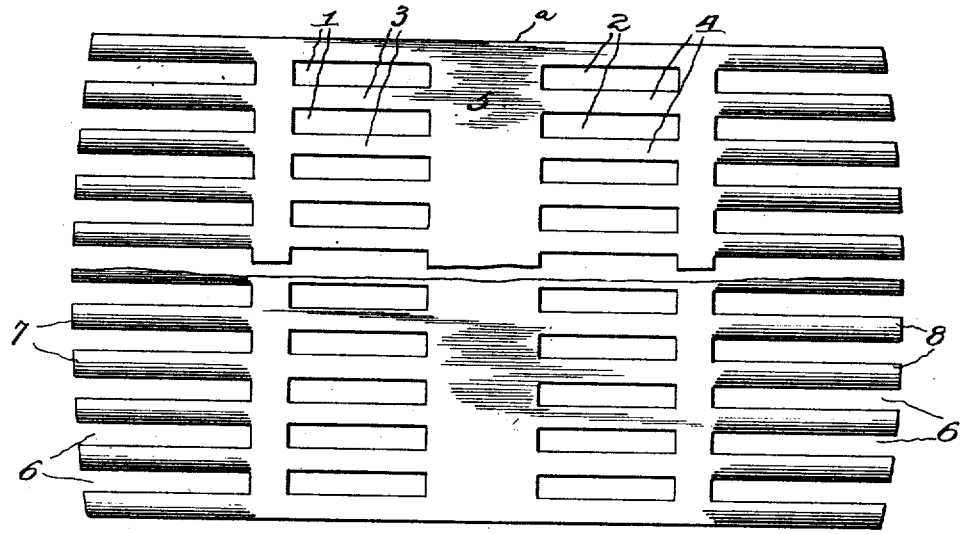
Fig. 2 is a plan view of the blank from which the top of the trap is formed.
Figure 3:
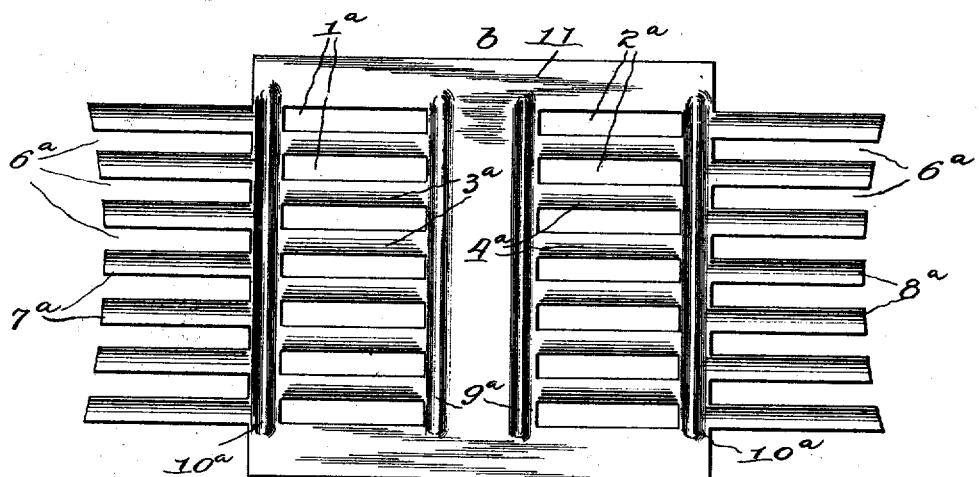
Fig. 3 is a similar view of a blank for the bottom of the trap.

Referring to Fig. 2 of the drawing, $a$ represents an elongated metal sheet punched to provide two series of longitudinal slots 1, 2, and intervening bars 3, 4, at opposite sides of its central portion 5, and the ends of the sheet are slotted as shown at 6, to provide two series of transversely spaced end bars 7, 8. This sheet is passed through rolls and bent into semi-cylindrical shape to form the top piece $a'$ of the trap, and is corrugated transversely at the center, as shown at 9, and also between the bars 3 and 7 and 4 and 8, as shown at 10. The end bars are longitudinally corrugated to strengthen them.

The bottom piece $b$ is similarly slotted and corrugated, having slots $1^a$, $2^a$, and $6^a$, the bars $3^a$, $4^a$, and corrugated end bars $7^a$ and $8^a$, and it has the transverse corrugations $9^a$ and $10^a$. The bottom piece has wide lateral margins 11, adapted to be bent upwardly to form flanges $11^a$, for connecting said piece to the top piece.

In assembling the trap, the flanges on the bottom piece are riveted to the lateral edges of the top piece, and the end bars of the two parts are then bent inwardly so as to converge about annular entrance and exit fittings $c$ and $d$. Each fitting comprises a scalloped outer binding ring 12, the raised portions $12^a$ of which fit over the corrugated end bars and an inner ring 13 which is riveted through some of the end bars to the outer ring, as shown at 14.

The trap will be provided with the usual central fitting for allowing animals to pass from one end of the trap to the other, without permitting their return, but this is not shown in the drawing as it forms no part of my invention.

What I claim is:

1. In a sheet metal animal trap, a top and a bottom, each comprising an elongated metal sheet having its ends slotted longitudinally, forming a plurality of spaced end bars, and annular entrance and exit fittings of smaller diameter than the body, secured to the ends of said bars.

2. In a sheet metal animal trap, a top and a bottom, each comprising an elongated metal sheet having its ends slotted longitudinally, forming a plurality of spaced end bars, said bars being longitudinally corrugated, and annular fluted entrance and exit fittings secured to the ends of said bars.

3. In a sheet metal animal trap, a top and a bottom, each comprising an elongated metal sheet having spaced transverse corrugations and having spaced longitudinal slots between said corrugations, the ends of said sheets, beyond the corrugations being slotted longitudinally forming a plurality of spaced end bars, said end bars being longitudinally corrugated, and annular entrance and exit fittings secured to the ends of said end bars.

In testimony whereof I affix my signature.

EDWIN ROLKER.